(12) United States Patent  (10) Patent No.: US 6,409,302 B2
Altfather et al.  (45) Date of Patent: *Jun. 25, 2002

(54) SENSING SYSTEM FOR DETECTING PRESENCE OF AN INK CONTAINER AND LEVEL OF INK THEREIN

(75) Inventors: Kenneth W. Altfather, Fairport; Michael Carlotta, Sodus; Steven J. Dietl, Ontario; Donald M. Stevens, Walworth; Fred F. Hubble, III, Rochester, all of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/792,980

(22) Filed: Feb. 26, 2001

Related U.S. Application Data

(62) Division of application No. 09/305,990, filed on May 6, 1999, which is a division of application No. 08/572,595, filed on Dec. 14, 1995, now Pat. No. 5,997,121.

(51) Int. Cl.$^7$ ................................................. B41J 2/01

(52) U.S. Cl. ........................................... 347/19; 347/86

(58) Field of Search ............................. 347/19, 86, 87, 347/49; 250/573, 574, 577; 359/524.53; 385/36; 399/13; 349/12, 27

(56) References Cited

U.S. PATENT DOCUMENTS

| | | | |
|---|---|---|---|
| 4,342,042 A | 7/1982 | Cruz-Uribe et al. | 346/140 R |
| 4,571,599 A | 2/1986 | Rezanka | 346/140 R |
| 4,639,738 A | 1/1987 | Young et al. | 346/75 |

(List continued on next page.)

FOREIGN PATENT DOCUMENTS

| | | |
|---|---|---|
| DE | 3408302 A1 | 9/1985 |
| EP | 0573274 A2 | 12/1993 |
| FR | 2672390 | 8/1992 |
| JP | 62-021549 | 1/1987 |
| JP | 63-216751 | 9/1988 |
| JP | 0412459 A2 | 3/1990 |
| JP | 04144754 | 5/1992 |
| JP | 5332812 | 12/1993 |
| JP | 07-117238 | 5/1995 |
| JP | 07-218321 | 8/1995 |
| JP | 07-311072 | 11/1995 |

*Primary Examiner*—Craig A. Hallacher
(74) *Attorney, Agent, or Firm*—David J. Arthur

(57) ABSTRACT

A low ink sensing system is combined with an ink cartridge detection system to enable a more efficient ink jet printer. An ink container which supplies ink to an associated printhead is modified by the incorporation of two light directing elements, in the preferred embodiment, a faceted prism and a roof mirror, into a transparent wall of the container housing. The cartridge, comprising the ink container and associated printhead, is mounted on a scan carriage. Periodically, the carriage is conveyed to a sensing station comprising a pair of light sources and a commonly used photosensor. A first light source is energized and a beam of light is directed to a location where the roof mirror, would be positioned if the cartridge is present. If the cartridge is absent, lack of a reflected return signal is sensed, indicating a cartridge has not been inserted. Print operation is halted until a cartridge is inserted. If a cartridge is properly inserted, the roof mirror returns most of the incident light to the photosensor which generates a signal indicating the presence of the cartridge. A second light source is then energized and directed towards the faceted prism, which is either immersed in ink or exposed to air within the interior of the container. If the latter, light is internally reflected by the prism facets back to the photosensor. If a print operation has been in progress, and the ink level has fallen, the common photosensor detects either a strong or weak redirected light component and initiates a status check and generates appropriate displays of low ink level or out of ink warnings.

10 Claims, 10 Drawing Sheets

U.S. PATENT DOCUMENTS

| | | | |
|---|---|---|---|
| 4,695,851 A | 9/1987 | Terasawa | 346/140 R |
| 4,709,244 A | 11/1987 | Piatt et al. | 346/140 R |
| 4,709,245 A | 11/1987 | Piatt | 346/140 R |
| RE32,572 E | 1/1988 | Hawkins et al. | 156/626 |
| 4,809,551 A | 3/1989 | Grossiord | 73/327 |
| 4,833,491 A | 5/1989 | Rezanka | 346/140 R |
| 5,049,898 A | 9/1991 | Arthur et al. | 347/19 |
| 5,079,570 A | 1/1992 | Mohr et al. | 346/140 R |
| 5,136,305 A | 8/1992 | Ims | 346/1.1 |
| 5,138,332 A | 8/1992 | Carlotta | 346/1.1 |
| 5,221,397 A | 6/1993 | Nystrom | 156/273.5 |
| 5,255,019 A | 10/1993 | Mochizuki et al. | 346/140 R |
| 5,274,245 A | 12/1993 | Lee | 250/577 |
| 5,289,211 A | 2/1994 | Morandotti et al. | 346/140 R |
| 5,386,224 A | 1/1995 | Deur et al. | 347/7 |
| 5,406,315 A | 4/1995 | Allen et al. | 347/7 |
| 5,414,452 A | 5/1995 | Accatino et al. | 347/7 |
| 5,422,664 A | 6/1995 | Stephany | 347/14 |
| 5,422,756 A | 6/1995 | Weber | 359/487 |
| 5,434,603 A | 7/1995 | Hunt | 347/7 |
| 5,467,116 A | 11/1995 | Nakamura et al. | 347/50 |
| 5,481,637 A | 1/1996 | Whitehead | 385/125 |
| 5,555,329 A | 9/1996 | Kuper et al. | 385/36 |
| 5,616,929 A | 4/1997 | Hara | 250/573 |
| 5,842,800 A | 12/1998 | Bailey et al. | 400/703 |
| 5,870,113 A | 2/1999 | Koizumi | 347/14 |
| 5,997,121 A | 12/1999 | Altfather et al. | 347/7 |
| 6,015,204 A | 1/2000 | Ha | 347/37 |
| 6,234,603 B1 * | 5/2001 | Altfather et al. | 347/19 |

* cited by examiner

SENSING SYSTEM FOR DETECTING PRESENCE OF AN INK CONTAINER AND LEVEL OF INK THEREIN

This application is a divisional of application Ser. No. 09/305,990, filed May 6, 1999, which in turn is a divisional of application Ser. No. 08/572,595, filed Dec. 14, 1995, now issued as U.S. Pat. No. 5,997,121.

BACKGROUND AND MATERIAL DISCLOSURE STATEMENT

The present invention relates to ink jet recording devices and, more particularly, to a system for detecting the presence of an ink supply container and also for detecting when the level of ink in the container is at or below a predetermined level.

Ink jet recording devices eject ink onto a print medium such as paper in controlled patterns of closely spaced dots. To form color images, multiple groupings of ink jets are used, with each group being supplied with ink of a different color from an associated ink container.

Thermal ink jet printing systems use thermal energy selectively produced by resistors located in capillary filled ink channels near channel terminating nozzles or orifices to vaporize momentarily the ink and form bubbles on demand. Each temporary bubble expels an ink droplet and propels it toward a recording medium. The printing system may be incorporated in either a carriage type printer or a pagewidth type printer. A carriage type printer generally has a relatively small printhead containing the ink channels and nozzles. The printhead is usually sealingly attached to an ink supply container and the combined printhead and container form a cartridge assembly which is reciprocated to print one swath of information at a time on a stationarily held recording medium, such as paper. After the swath is printed, the paper is stepped a distance equal to the height of the printed swath, so that the next printed swath will be contiguous therewith. The procedure is repeated until the entire page is printed. In contrast, the pagewidth printer has a stationary printhead having a length equal to or greater than the width of the paper. The paper is continually moved past the pagewidth printhead in a direction normal to the printhead length at a constant speed during the printing process. Moving carriage type ink jet printers must either carry the ink container along with the printhead or provide a flexible ink supply line between the moving printhead and a stationary ink container. Pagewidth printers have an ink supply container located outside the print zone and directly connected to the printbar ink channels.

For either a partial width printhead on a moving carriage or for a pagewidth printbar, it is desirable to have a low ink level warning to alert a user to replace or refill the ink container so that the ink does not run out during a print job. Presently, for some applications (such as plotting), some users choose to install new print containers prior to starting an extensive printing job because it is less costly to replace a questionable container rather than lose one or more colors in the output prints. It is also important to ensure that the ink supply container is in the proper location; e.g., fluidly connected to the associated printhead. In some instances, an out of ink container may be removed but a replacement container neglected to be inserted. Printer operation with the container removed could potentially damage the associated printhead.

Various prior art methods and devices are known for detecting reduced levels of ink in an ink supply container.

U.S. Pat. No. 4,342,042 discloses an ink sensing system which includes output from an LED sensor reflected from a flexible membrane which serves as the upper surface of an ink supply reservoir. The membrane contracts as the ink level is depleted, and the LED sensor detects the contraction and generates a low ink level signal.

U.S. Pat. No. 5,079,570 provides a method for detecting ink levels in an ink cartridge where the ink is supplied from a foam reservoir. A binary fluidic indicator is fluidly coupled with the foam reservoir and is triggered when the fluid level in the foam reaches a certain prescribed level.

U.S. Pat. No. 5,289,211 discloses a low ink detecting system which includes a pair of electrodes immersed in the ink impregnated foam reservoir. The electrodes are connected to a bridge circuit which measures the electrical resistance of the ink between the two electrodes.

U.S. Pat. No. 5,414,452 uses a logic circuit which counts the number of drops expelled and compares the instant number with the maximum number of drops equivalent to a known value of ink in the ink reservoir.

U.S. Pat. No. 5,434,603 discloses a visual indicator system where sidewalls of the reservoir retreat inwardly during ink depletion changing the orientation of indicator stripes and modifying the color visible to an observer through a window.

U.S. Pat. No. 5,386,224 places a level sensing probe into the ink supply and senses electrical conductivity changes of the ink.

U.S. Pat. No. 5,136,305 discloses a low ink detecting system wherein a thermistor is placed in the ink supply and periodically energized. The temperature rise of the ink is measured and compared with pre-established values to determine the ink depletion state of the reservoir.

U.S. Pat. No. 4,639,738 discloses a detection system which incorporates detection ports in the cartridge for detecting pressure conditions in the top and bottom of the cartridge. The ports are coupled to a pressure differential sensor that signals a refill condition.

Japanese publication 5-332812 describes a low ink detection system wherein the cartridge has a transparent optical path member installed in an opening of a surface of an ink storage tank. An LED emits a beam of light which is guided into the ink tank and reflected back to a sensor to provide an indication of low ink levels.

Some of the prior art references are relatively expensive relying on measurement and detection of ink conductivity or drop detecting circuitry. Further, none of the prior art references includes means for insuring that the ink tank is in proper position before beginning the ink level sensing operation.

SUMMARY OF THE INVENTION

It is, therefore, one object of the present invention to provide a detection system which confirms the proper installation of an ink container supplying ink to an associated printhead.

It is another object to present a detection system for detecting a low level of ink in the ink container and for providing a low ink level warning signal.

Another object of the invention is to provide an ink supply container which is constructed so as to enable an inexpensive optical detection system which performs both the ink container detection as well as the low ink level detection function.

In the present invention, and in an exemplary embodiment, a thermal printer is disclosed which includes a printhead for printing on a recording medium in response to image drive signals. Ink is supplied to the printhead from an ink container which is fluidly connected to the printhead. The printhead and container are mounted on a scanning carriage which moves back and forth across a print zone, the printhead ejecting ink droplets from nozzles to form an image on the recording medium. An optical system comprising two light sources and a light detector is fixedly located along the path of travel of the carriage and positioned so that light from the light source is directed into the ink container as it is positioned opposite the optical system. The ink container has optical light directing elements formed in a transmissive wall. Light from the light sources are directed into and onto the container through the transparent wall and, sequentially, onto the optical elements. In one embodiment, the light directing elements are reflective prisms; reflections of light from these elements, or lack thereof, is sensed by a common photosensor to provide signals representing the presence or absence of the container and the level of ink remaining in the container.

More particularly, the present invention relates to a sensing system for detecting the presence of an ink container and the level of ink therein comprising:

first light directing means operatively connected to said container, a first light source having output beams directed toward said light directing means when in a container detect mode, photosensor means for detecting the presence or absence of light directed from said light directing means and for generating an output signal indicative thereof, second light directing means operatively connected to said container, a second light source having output beams directed toward said second light directing means when in a low ink level detect mode and photosensor means for detecting light directed from said second light directing means, the level of detected light and hence the level of the photosensor output being representative of the presence or absence of ink adjacent the interior surface of the second light directing means.

Further, the present invention relates to a method for detecting the presence or absence of a cartridge mounted on a movable carriage and used in an ink jet printer and the level of ink in an ink container associated with said cartridge including the steps of:

directing a beam of light into an optical sensing station, moving said carriage into said optical sensing station so that a portion of said cartridge, if present, intercepts said light beam, sensing the presence or absence of light redirected back from said portion and generating a signal representative of the presence or absence of a cartridge.

The invention also relates to a system for sensing the presence or absence of an ink cartridge in an ink recording device, said cartridge including a printhead and an ink container for supplying ink to said printhead, said system including:

at least one printhead for printing each of a first color onto a recording medium, an associated ink supply container for providing ink of said first color to said printhead, said container having at least a partially transparent section of a wall, said wall having at least a reflective member associated therewith, means for moving said cartridge along a scan path, an optical sensing station located along said scan path and comprising a light source and a photosensor, means for moving said cartridge into said station so that, if said cartridge is physically present the reflective member is opposite said light source output and means for energizing said light source, said photosensor either sensing a light source output beam reflected from said reflective member thereby indicating the presence of a cartridge or sensing lack of an reflected light indicating the absence of a cartridge.

DESCRIPTION OF THE INVENTION

Figure 1:
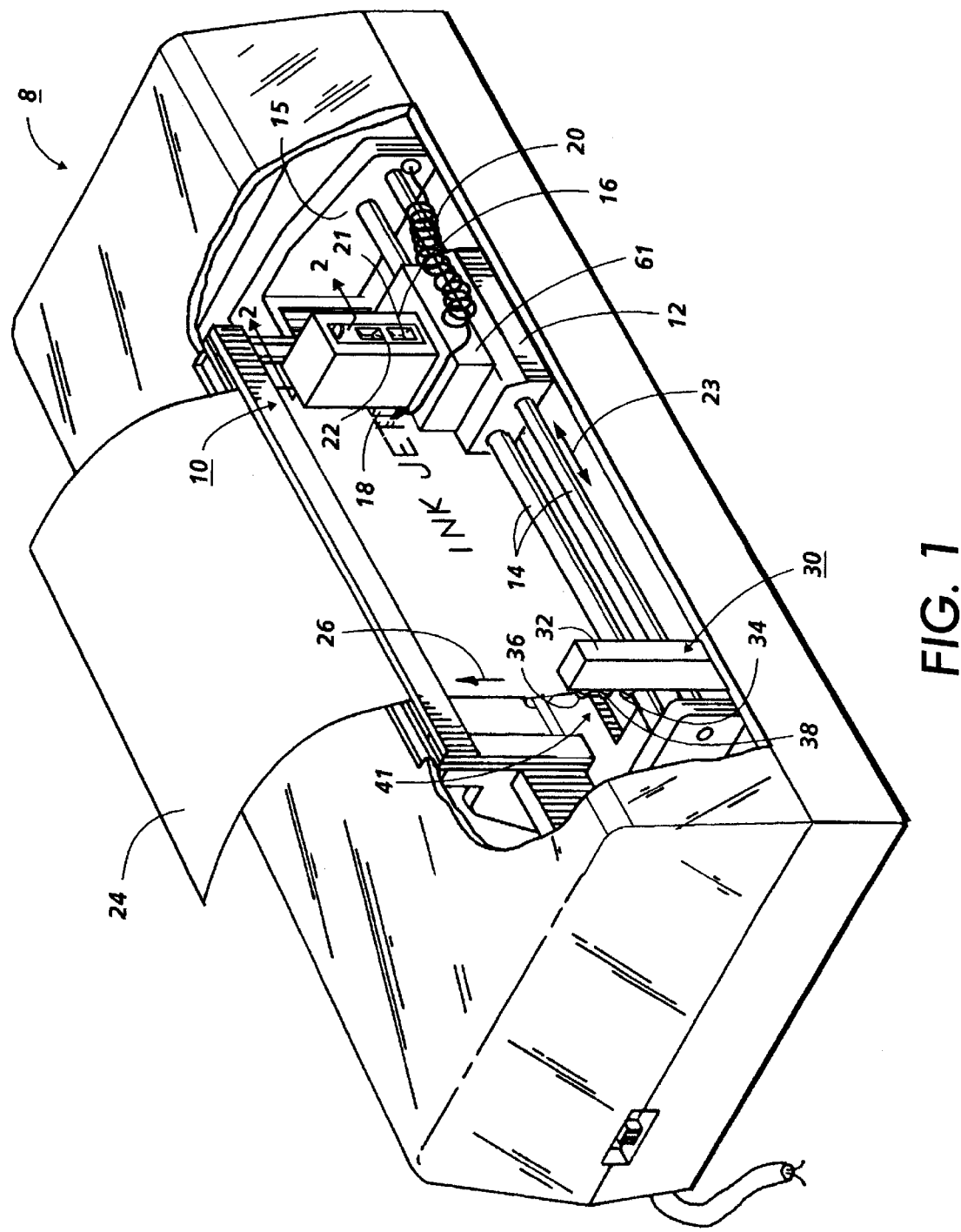
FIG. 1 illustrates a perspective view of an ink jet printer which incorporates the ink container and low ink level sensing system of the present invention.

FIG. 1 illustrates a perspective view of a thermal ink jet printer 8 which incorporates a preferred embodiment of the ink container and low ink detection system of the present invention. Printer 8 is exemplary only. The invention can be practiced in other types of thermal ink jet printers as well as other reproduction devices such as piezoelectric printers, dot matrix printers and ink jet printers driven by signals from a document Raster Input Scanner. Printer 8 includes an ink jet printhead cartridge 10 mounted on a carriage 12 supported by carriage rails 14. The carriage rails are supported by a frame 15 of the ink jet printer 8. The printhead cartridge 10 includes a container 16 shown in detail in FIG. 2, containing ink for supply to a thermal ink jet printhead 18 which selectively expels droplets of ink under control of electrical signals received from a controller 50 (FIG. 4) of the printer 8 through an electrical cable 20. Container 16 comprises a housing 17 having a wall 17A seating reflective elements 21 and 22, shown in further detail in FIG. 2. Container 16 is fluidly, but detachably connected, to printhead 18 and can be replaced when the ink is depleted therefrom. Alternatively, the entire cartridge can be replaced upon each depletion depending upon the particular system requirements. The printhead 18 contains a plurality of ink channels which carry ink from the container 16 to respective ink ejecting orifices or nozzles. When printing, the carriage 12 reciprocates back and forth along the carriage rails 14 in the direction of the arrow 23, the entire width traverse constitutes a scanning path. The actual printing zone is contained within the scanning path. As the printhead cartridge 10 reciprocates back and forth along a print path and past a recording medium 24, such as a sheet of paper or a transparency, droplets of ink are expelled from selected ones of the printhead nozzles towards the sheet of paper. Typically, during each pass of the carriage 12 the recording medium 24 is held stationary. At the end of each pass, the recording medium 24 is stepped in the direction of the arrow 26. For a more detailed explanation of the operation of printer 8, reference is hereby made to U.S. Pat. No. 4,571,599 and U.S. Pat. No. Reissue 32,572, which are incorporated herein by reference.

Figure 2:
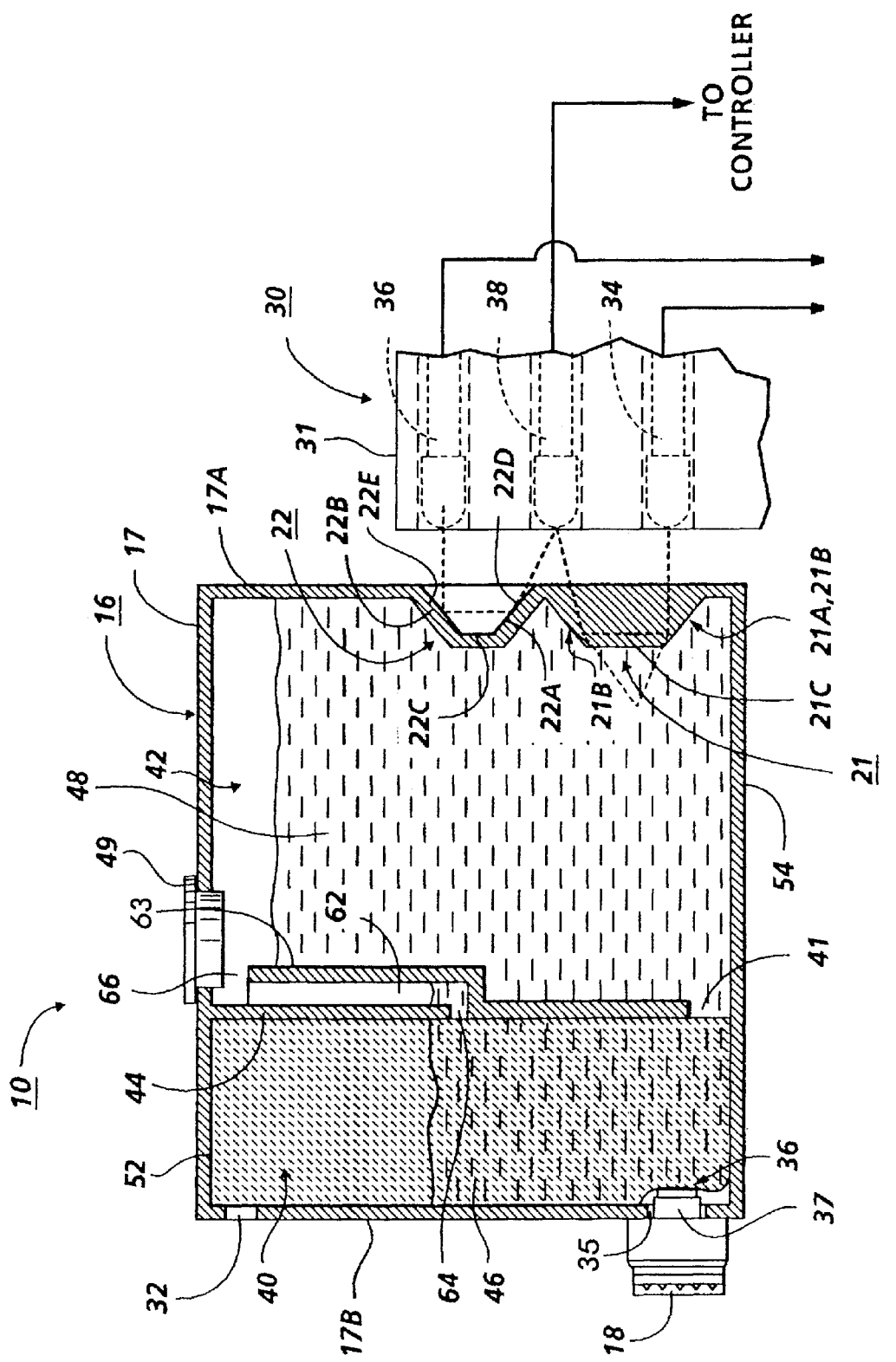
FIG. 2 is a cross-sectional view through the ink cartridge shown in FIG. 1.

Also shown in FIG. 1 is an optical sensing assembly 30. Referring to FIGS. 1 and 2, assembly 30 includes a housing 31 within which are mounted a first light source 34, a second light source 36 and a photosensor 38 located between the two light sources and commonly used therewith as will be seen. The light sources are electrically connected to a power source while the photosensor 38 output is electrically connected into the system controller circuits as will be seen. Container 16, in a preferred embodiment, is designed as a two compartment unit. Assembly 30 is mounted in the carriage path so that, as container housing wall 17A moves into a position opposite the assembly 30, the light from light source 34 is directed toward light directing element 21, and light from light source 36 is directed toward light directing element 22 Photosensor 38 is positioned to detect light directed from either element 21 or element 22 in the manner described in further detail below.

FIG. 2 includes a cross-sectional view of the printhead cartridge 10 along the line 2—2 of FIG. 1 and shows the housing 17 and the printhead 18 attached to the container. The printhead 18 is fluidly but detachably connected to the container 16. The housing 17 is made of a lightweight but durable plastic, which in a preferred embodiment, is polypropylene. Housing 17 has an air inlet 32 and an ink outlet 35 formed within wall 17B. The air inlet 32 provides for the transfer of air between the interior of housing 17 and the ambient. Ink outlet 35 provides for fluid transfer of ink contained in the ink container 16 from the interior of the housing 17 to the ink jet printhead 18. Manifold 37 directs filtered ink from the ink outlet 35 into printhead 18 and to the ink ejecting orifices for ejecting ink onto the recording medium 24.

Housing 17 defines an interior space partitioned into a first chamber 40 and a second chamber 42 by a dividing member 44. The dividing member 44 extends from one side wall of the housing 17 to an opposite side wall of the housing and essentially divides the housing into the first chamber 40 and the second chamber 42 such that the second chamber 42 is larger than the first chamber 40.

The first chamber 40 contains an ink retaining member 46 typically made of a foam material to hold liquid ink. Liquid ink 48, stored in the second chamber 42, is transferred from the second chamber 42, which is substantially free of ink retaining material, to the ink retaining material 46 through an ink inlet 41 defined by the dividing member 44. A fill port 49 allows for filling the cartridge with ink.

The ink 48 passes into the ink retaining material 46 through the ink inlet 41 and ink is released through ink outlet 35 as necessary to supply the printhead 18 with ink for printing. To maintain a proper amount of ink in the ink retaining material 46 for supply to the printhead 18, the housing 17 includes a mechanism for transferring ink from the second chamber 42 to the first chamber 40 by maintaining a proper amount of air pressure above the liquid ink 48 for filling the material 46 with ink when necessary. This mechanism includes a directing member 63, which defines, with the dividing member 44, an air transfer passageway 62 having a vent inlet 64 coupled to a vent outlet 66 for pressurizing the second chamber 42 to a static (no flow) condition. The directing member 63 does not extend from one sidewall to an opposite sidewall as does the dividing member 44, but instead forms a vent tube.

The construction of the container 16 compartments as described to this point is exemplary. There are other known ways of constructing an ink supply container with dividing sections while maintaining an appropriate back pressure to the printhead nozzle. See for example, the container described in U.S. Pat. No. 5,138,332 and in co-pending application Ser. No. 08/333,704, both of which are incorporated by reference. For purposes of the present invention, it is understood that the container is constructed so that, during operation, ink moves from chamber 42 to chamber 40 through the passageway between the two compartments under pressure conditions established by techniques well known to those skilled in the art. Of interest to the present invention is the modification made to the ink container 16 by introducing the prism member 21 and roof mirror 22 to the wall 17A defining the rear of chamber 42.

Referring particularly to FIG. 2, in a preferred embodiment, light directing element 21 is a reflector integrally formed in the bottom half of wall 17A and made of the same light transmissive material as the wall; e.g. polypropylene, in a preferred embodiment. Polypropylene, or other hydrophilic materials are preferred. The prism is constructed with facet surfaces 21A, 21B extending into the interior of compartment 42 and angled toward each other at an approximately 82° angle. The prism has a truncated pyramidal shape with surfaces 21A, 21B connected by facet surface 21C. The prism may be constructed of multiple narrow facet sections to avoid sink commonly encountered when injection molding large sections and also to provide enhanced light pipings.

Light directing element 22 is also formed as part of wall 17A. In the preferred embodiment, element 22 is a prism having two facet surfaces 22A, 22B extending into the interior of compartment 42 and angled towards each other and connected by surface 22C. Element 22 is formed into a roof mirror by placing reflective films, foils or tapes 22D, 22E on surfaces 22A, 22B, respectively.

It will be appreciated from the above that only a portion of wall 17A need be transmissive; e.g., the portion accommodating reflective element 21. Further, while the preferred embodiment has the reflective elements constructed integrally with the housing wall, the elements could be separately positioned adjacent the interior surface of wall 17A.

Operation of Sensing System

Figure 3:
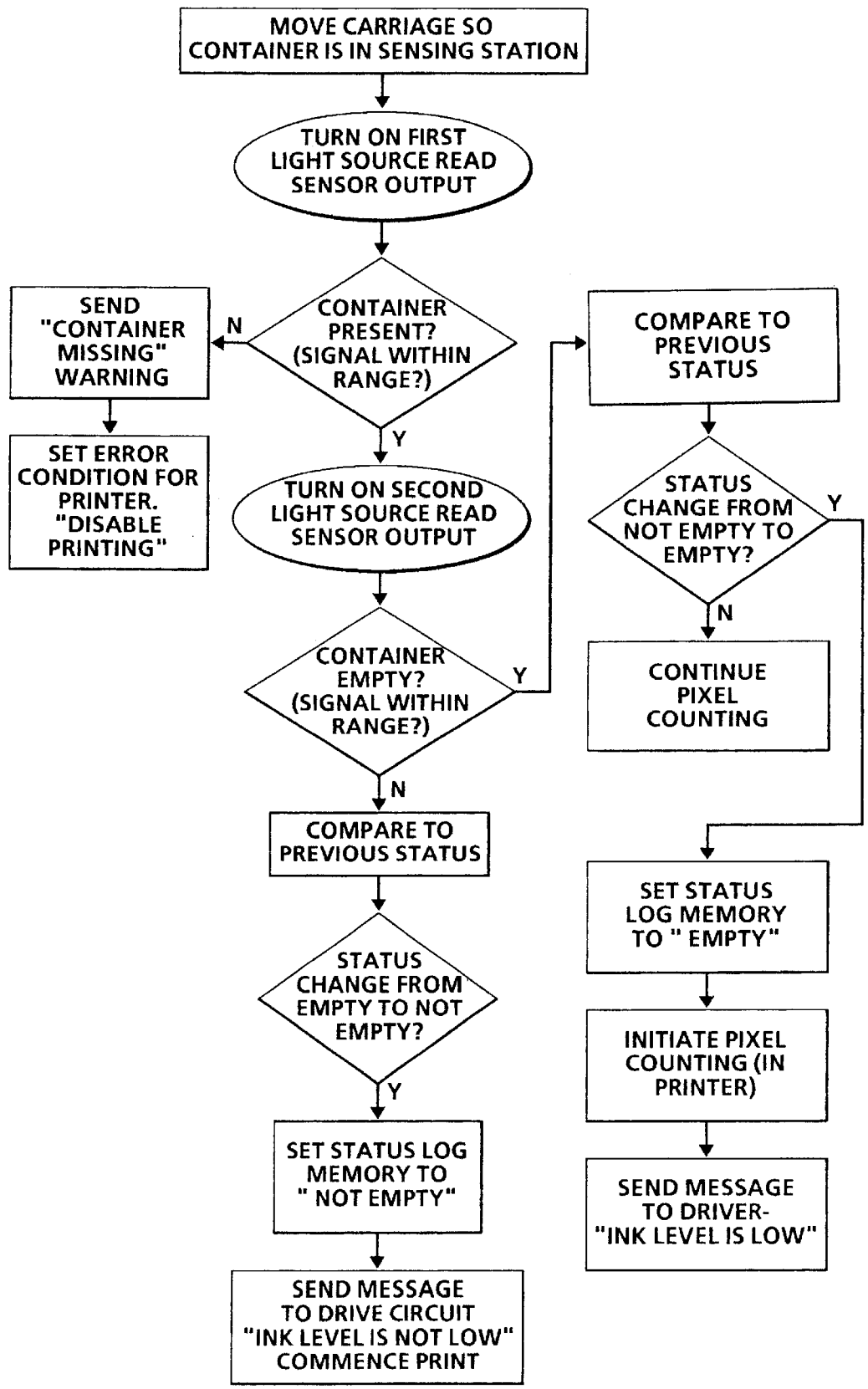
FIG. 3 is an algorithm which is used to sequence the checks to determine presence or absence of a container as well as level of ink within the container.
Figure 4:
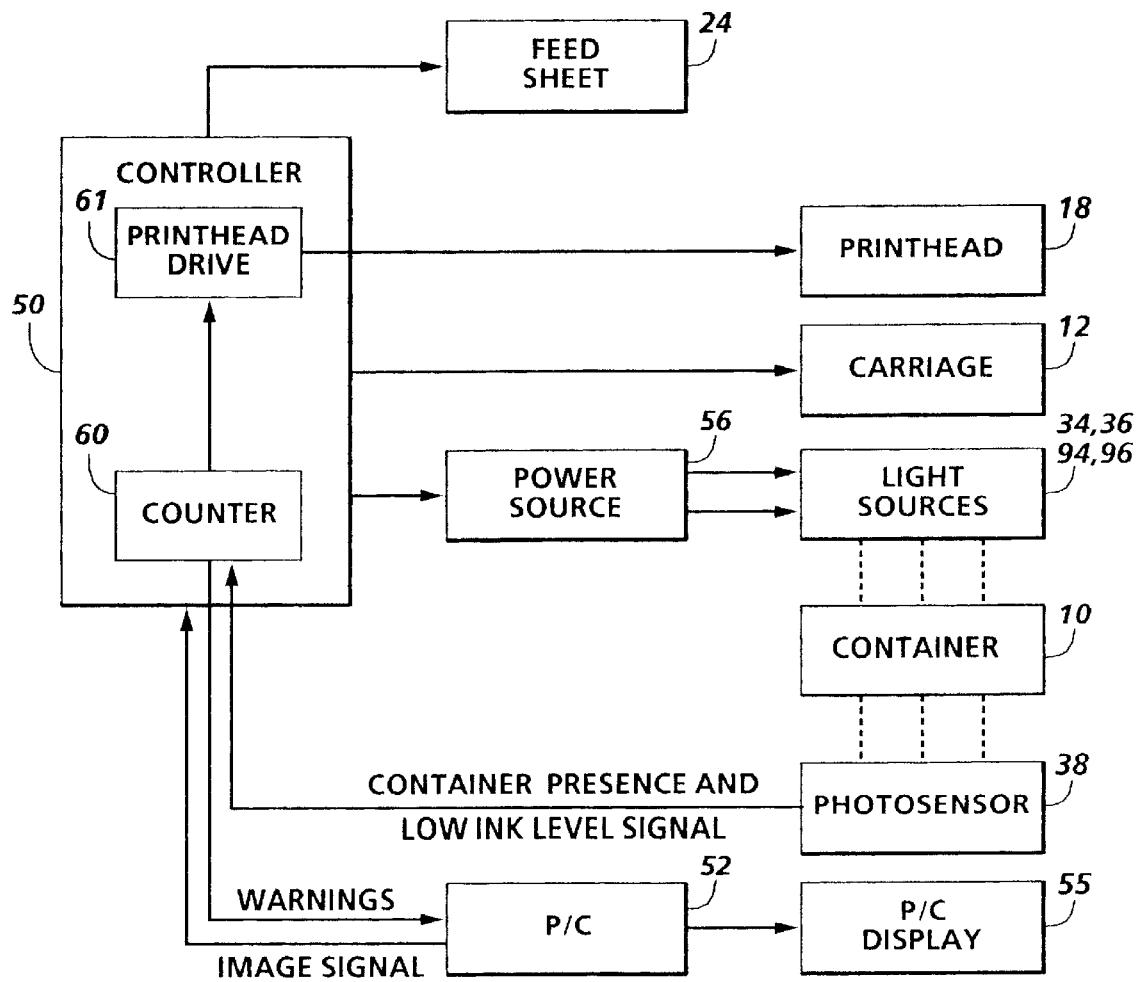
FIG. 4 is a block diagram of the control circuitry for controlling operation of the sensing system.

The sensing system of the present invention, which is considered to comprise the combination of reflective elements 21, 22 and the optical assembly 30, is designed to be enabled to perform an ink container presence and a low ink level check following a specific events such as the start of a print job or after the printing of a certain amount of prints. To perform the checks, the printer follows an algorithm that requires the ink container to be positioned adjacent assembly 30 and then sequenced through a series of detection steps. FIG. 3 is one embodiment of an algorithm that can be used. FIG. 4 shows control circuitry for implementing the ink container and ink level sensing system. A main controller 50 conventionally includes a CPU, a ROM for storing complete programs and a RAM. Controller 50 controls the movement of carriage 12 as well as other printer functions described below.

When a line recording operation is performed, each resistor associated with a jet in printhead 18 is driven selectively in accordance with image data from a personal computer P/C 52 or other data source sent into controller 50. Controller 50 sends drive signals to the printhead heater resistors causing ink droplets to be ejected from the jets associated with the heated resistor thus forming a line of recording on the surface of the recording medium 24. With continued operation of the printhead, ink contained in chamber 42 of container 16 gradually becomes depleted until a level is reached which has been predetermined to constitute a low ink level.

For purposes of description, the sensing system will be considered as being activated, first at the beginning of a print job, and at a later time following a preset period of printer operation.

Operation at Start of Print Job

Referring to FIGS. 1–4, image signals from the P/C 52 to controller 50 initiate a start print sequence. Carriage 12 is moved to sensing station 41 so as to position housing wall 17A of container 16 adjacent and facing the optical assembly 30. Under control of controller 50, a power source 56 first energizes light source 36. Source 36, in a preferred embodiment, is an LED with a peak wavelength in the range of 880 to 940 nm. A beam of light is directed towards housing wall 17A and, if a container is present, light is reflected from reflective surfaces 22D, 22E of roof mirror 22 and redirected so as to impinge on photosensor 38. The two reflections allow the beam to be stepped vertically downward to avoid a higher than acceptable angle of incidence at the detector. The output signal from photosensor 38 is sent to logic circuitry within controller 50 which determines that the signal is within a preset range. The controller then sequences to power the second light source 34.

If a container 16 is not present, the light output of source 36 will not be reflected back to photosensor 38. The lack of output from the photosensor will be recognized in the computer as a "container missing" status. The printer will be disabled, and a warning display will be activated at P/C Display 55 informing the user that a) printing of the color associated with the missing tank will be prevented and b) the correct container should be installed to prevent potential damage to the printhead.

Figure 5A:
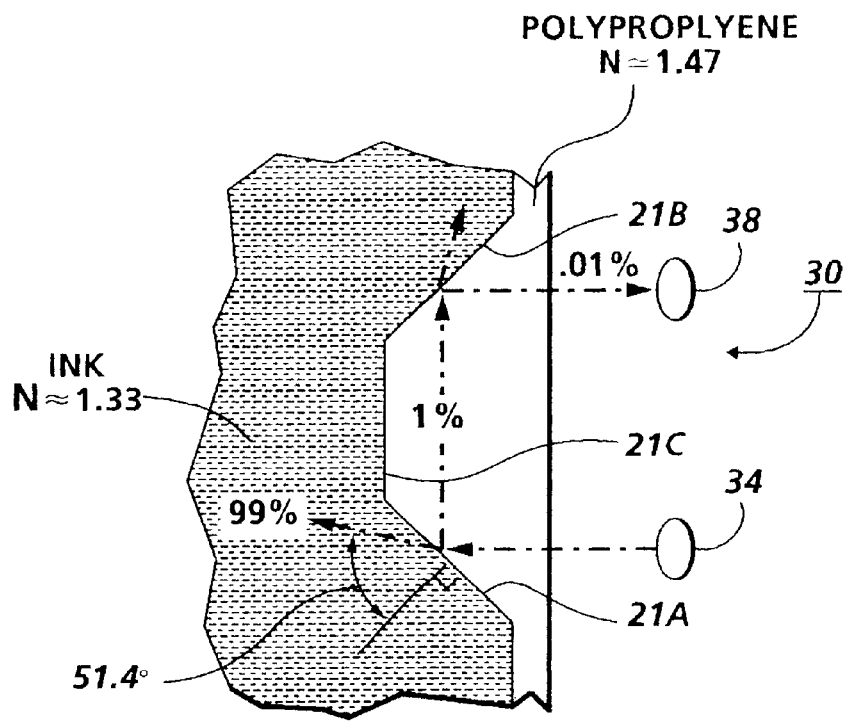
FIG. 5A is a cross-section of a prism-shaped reflective element within the cartridge showing the prism container with a sufficient level of ink.

In a preferred embodiment, light source 34 is also an LED with characteristics similar to source 36. Source 34 emits a beam of light which is transmitted through wall 17A and is incident on facet 21A of prism 21. FIG. 5A is a cross section of prism 21 and a schematic reproduction of the assembly 30 showing the path of the light beam when the prism is still immersed in ink and, hence, the level of ink exceeds a preset low level.

The low ink detection is enabled by application of the principle of total internal reflection. Total internal reflection occurs when a ray, passing from a higher to a lower index of refraction (from N to N'), has an angle of incidence whose sine equals or exceeds N'/N. The critical angle $I_c$ is expressed by the equation:

$$I_c = \arcsin N'/N \quad (1)$$

As shown in FIG. 5A, the output beam of LED 34 passes through wall 17A which, being polypropylene and with an index of refraction of approximately 1.492, is almost completely transparent to the light, allowing approximately 96% of the light incident thereon to pass through and be incident on facet surface 21A at an angle of incidence of about 45°. Since the back side of surface 21A is immersed in ink with an index of refraction of about 1.33, and the critical angle is not reached, approximately 99% of the incident light will be transmitted into the ink and at an angle of refraction of about 51.4° and only approximately <1% will be reflected to facet 21B. Since the interior facing side of facet 21B is also immersed in ink, >99% of the 1% will also be transmitted into the ink. Only a very small amount (approximately 0.01%) of the original incident energy will be reflected towards the photosensor 38. The output signal from the photosensor at controller 50 will register a low light level falling outside a low ink level preset range set in controller memory. The controller will compare this signal to a previous status signal to determine whether a container, previously identified as being in a low ink situation, has been replaced or refilled. A status log is then set, or reset, to a "not empty" level, and the printhead drive circuit 61 in controller 50 is enabled to send drive signals to the printhead to initiate a print sequence. The low ink level threshold for this embodiment has been set at 20% of the container 16 fill level.

To summarize the operation of the sensing system thus far, the presence of an ink container is confirmed. Further, it has been confirmed that the ink within the container is above preset levels, and therefore, a print job can be started. The ink level sensing system operation will now be described at a second time set to occur following some predetermined operational time.

Operation During Printing Job

As printer 8 begins to print a print job corresponding to image input signals from P/C 52, ink is drawn from the foam in compartment 40 (FIG. 2) thereby reducing the saturation of the foam. A flow path is created that allows ink from compartment 42 to replenish the foam. Thus, the level of ink in compartment 42 gradually falls during usage of the printer. A low ink check can be initiated at the end of each print job or after some predetermined number of pixels, e.g., 7×10⁶ pixels printed for any one color since the last check. For purposes of illustration, it will be assumed that a print job has been concluded drawing down the ink level in compartment 42 to a point below a predetermined trip point level represented by dotted line 80. A low ink level sensing procedure is initiated at this point.

Figure 5B:
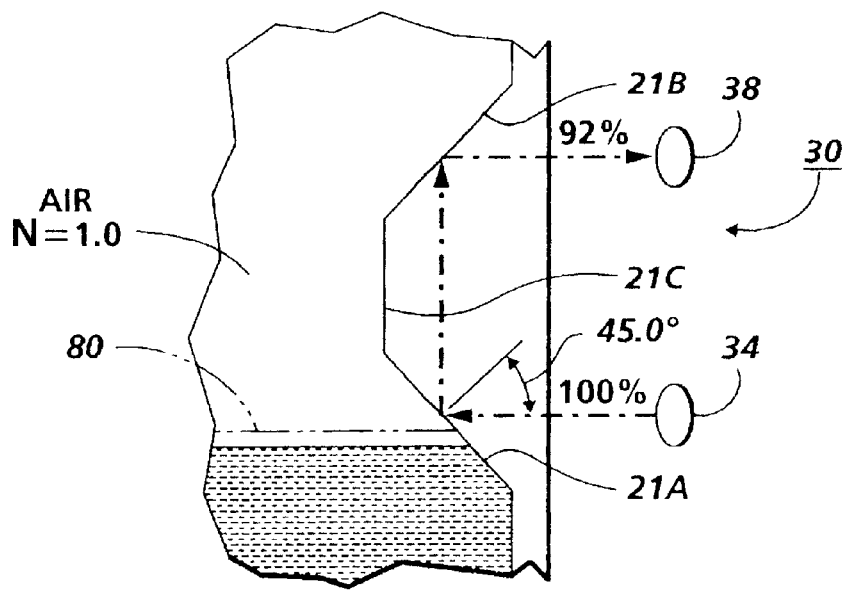
FIG. 5B is a cross-section of the prism of FIG. 5A showing the reflection path in a low ink environment.

Continued printing is interrupted and, as previously described, carriage 12 is moved to a position so that the housing wall 17A and prism 21 is opposite the sensing assembly 30. The controller again sequences through energization of light sources 34, 36 (the container detection may be omitted). FIG. 5B shows the effect of the low ink level on the light beam. Light from source 34 passes through wall 17A and is incident on facet 21A at about 45°. Since the ink level has dropped below the 20% fill level, ink is no longer in contact with the back surface of facet 21A which is now exposed to air with an index of refraction of 1.0. The critical angle of 42.9° is exceeded by the incident light on the facet; therefore, none of the incident light is transmitted through the surface. The rays are totally reflected back into the denser media resulting in total internal reflection (TIR) of the beam. All of the incident energy is reflected towards facet 21B. Since the back of that facet is also exposed in air, all of the energy is now directed back towards photosensor 38. About 92% of the incident energy (minus any absorption) is returned to impinge on photosensor 38. The output signal from the photosensor is recognized by controller logic as being within a preset low ink level range. The controller performs a status check to see if the change from a previous station status is from "not empty" to "empty". Since this is the case for the instant example, the status log memory in controller 50 is set to "empty" status and a low ink level signal is generated and displayed at P/C display 55. The low ink signal can be used, depending on the system requirements, to merely display a low ink level to an operator, to halt print operation until a cartridge refill or replacement is performed or, in the preferred embodiment, to allow operation to continue but with a modified "low ink" status. As shown in FIGS. 3 and 4, the controller sends a signal to P/C 52 which displays an appropriate warning defining the ink container that has just been checked is low on ink. Each ink container contains a remaining quantity of ink which can be correlated into a number of pixels (or drops) remaining. This number may be different for each ink color. The low ink signal generated in the controller logic enables counter 60 to begin counting the number of pixels (drops) ejected from the printhead jets and the drawing down of ink within the ink tank. When the pre-established number of pixels have been counted, the ink tank is defined as out of ink, and printing is automatically disabled. The termination occurs before the tank is completely exhausted (level of about 2–5%) in order to insure that the printhead and its ink channel lines are not emptied, a condition which would jeopardize the reliability of the printhead. During the time between the first detection of low ink and declaration of out of ink, increasingly urgent messages may be displayed at the P/C display. It is understood that the pixel value of the remaining ink is dependent upon the frequency of the low ink checks.

Figure 6:
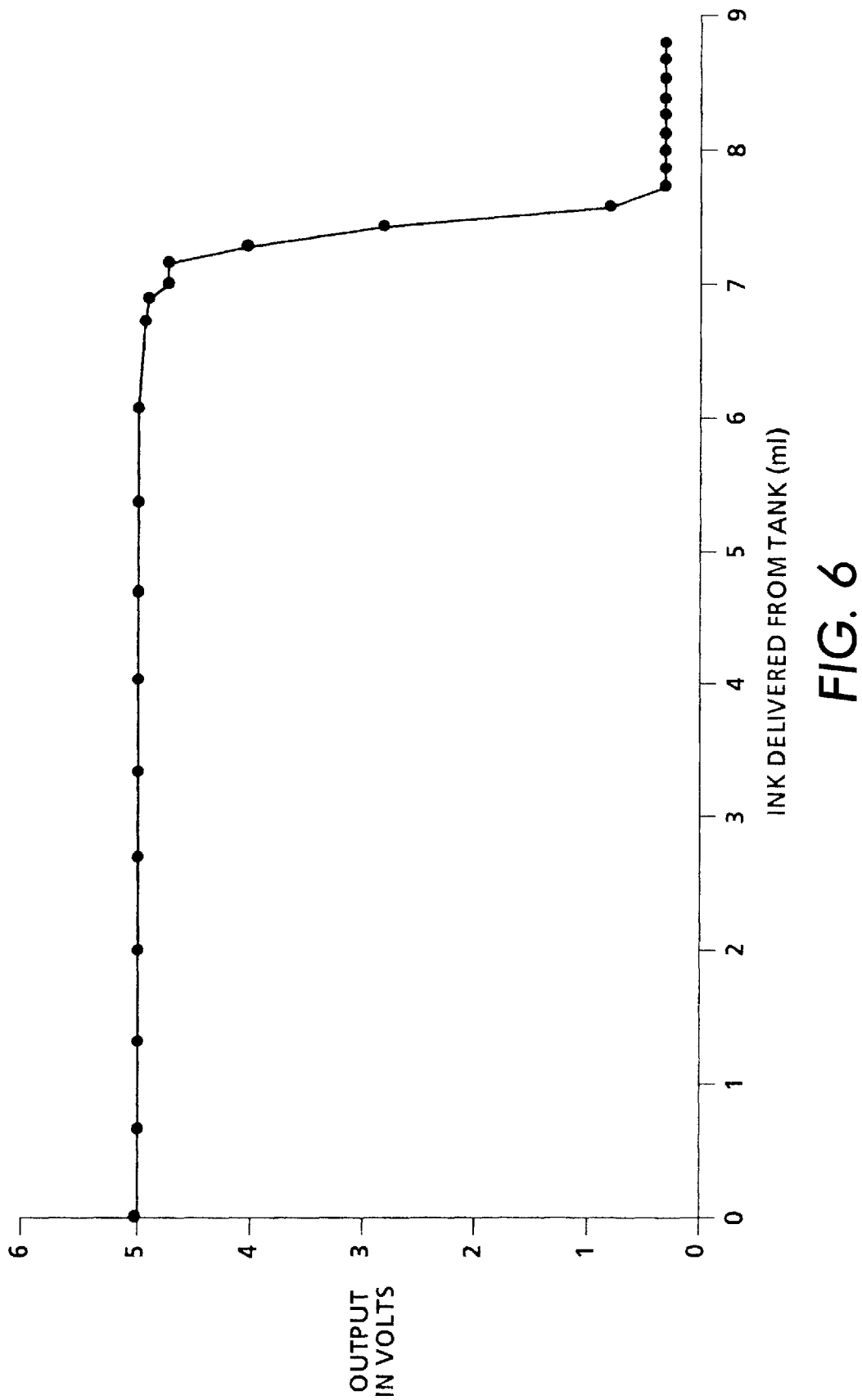
FIG. 6 is a plot of low ink sensing output signals versus volume of ink depleted from a cartridge.

The above scenario posited a condition wherein prism 21 was either completely immersed in ink or completely free of ink. In between these two cases is a transition represented by a monotonically increasing light level to the signal from LED 34 as the ink level gradually exposes more and more of facet 21A to air. FIG. 6 shows a plot of ink, in milliliters (ml), delivered to the printhead against sensor output in volts. For the first 70% of ink delivered, the sensor current is low, and the voltage output across a comparison circuit in controller 50 is high. Between 70 and 75% depletion, a rapid transition occurs as the LED 34 output beam begins to be totally internally reflected from facets 21A and 21B of prism 21 thus increasing the output current from sensor 38 and causing a rapid voltage drop in the circuit.

Figure 7:
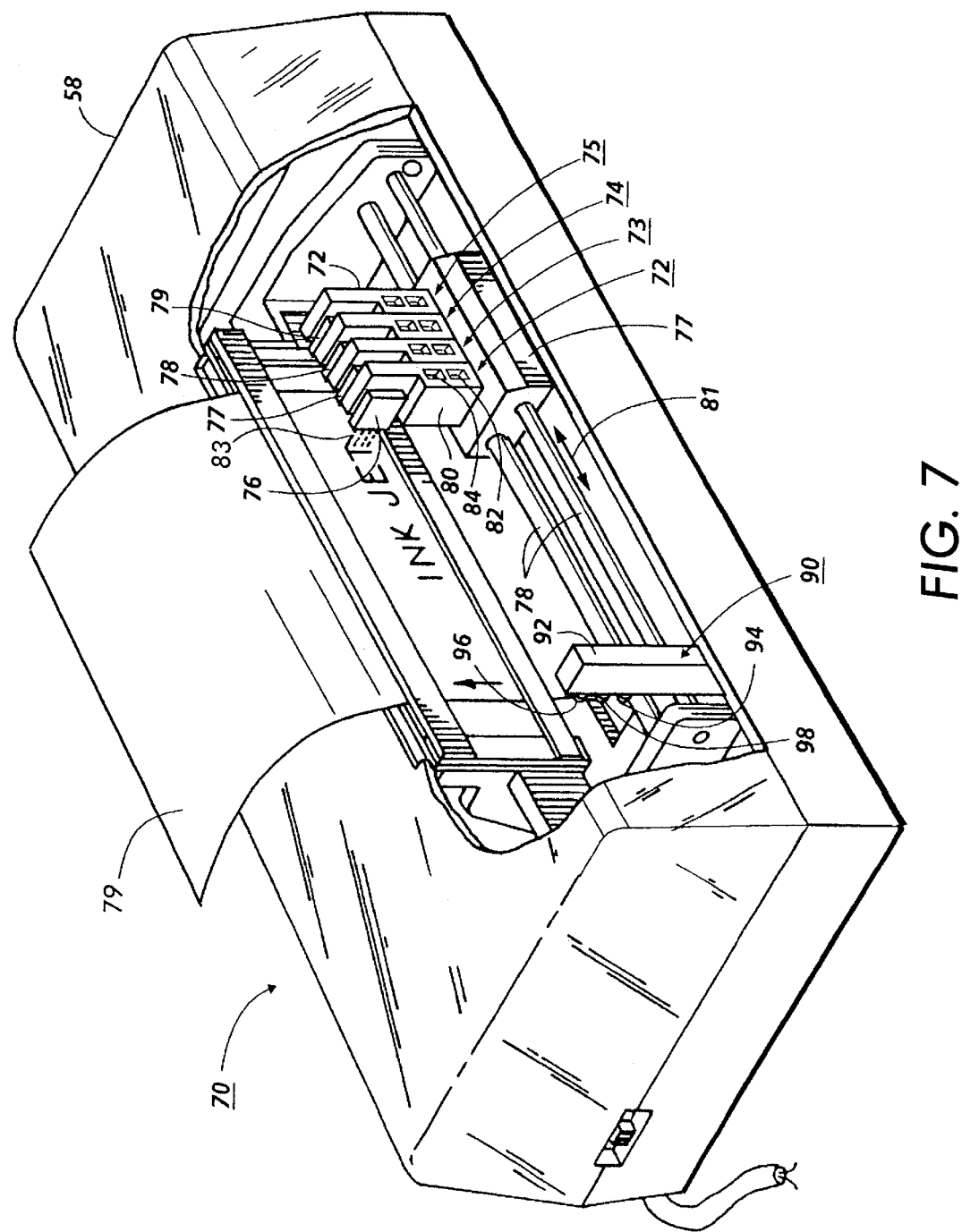
FIG. 7 illustrates a perspective view of a full color ink jet printer which incorporates the ink containers and low ink level sensing system of the present invention.

The invention may be used in other types of ink jet printing systems including full color printers. FIG. 7 shows a full color scanning type of printer. Referring to FIG. 7, a thermal ink jet printer 70 is shown. Several ink supply cartridges 72, 73, 74, 75, each with an integrally attached thermal printhead 76 to 79, are mounted on a translatable carriage 77. During the printing mode, the carriage 77 reciprocates back and forth on guide rails 78 in the direction of arrow 81. A recording medium 79, such as, for example, paper, is held stationary while the carriage is moving in one direction and, prior to the carriage moving in a reverse direction, the recording medium is stepped a distance equal to the height of the stripe of data printed on the recording medium by the thermal printheads. Each printhead has a linear array of nozzles which are aligned in a direction perpendicular to the reciprocating direction of the carriage. The thermal printheads propel the ink droplets 81, toward the recording medium whenever droplets are required, during the traverse of the carriage, to print information. The signal-carrying ribbon cables attached to terminals of the printheads have been omitted for clarity. The printer 70 can print in multiple colors, wherein each cartridge 72 to 75 contains a different color ink supply. For a representative color printer and additional control details, see for example, U.S. Pat. No. 4,833,491, the disclosure of which is incorporated herein by reference.

According to the invention, each of the ink containers forming part of cartridges 72–75 are of the same construction as the cartridge shown in FIG. 2, and for the purposes of the invention, each cartridge has an ink container having two prism reflectors formed in the wall facing outward. One reflector is associated with cartridge presence detection and the other with low ink detection. Cartridge 72 is shown having an ink container 80 with reflective members 82, 84. Cartridges 73–75 have similar containers and reflective members not specifically called out for ease of description. As in the single cartridge embodiment, a sensing assembly 90 includes a housing 92 within which are mounted a first light source 94 and a second light source 96 and a photosensor 98 located between the two light sources.

Figure 8:
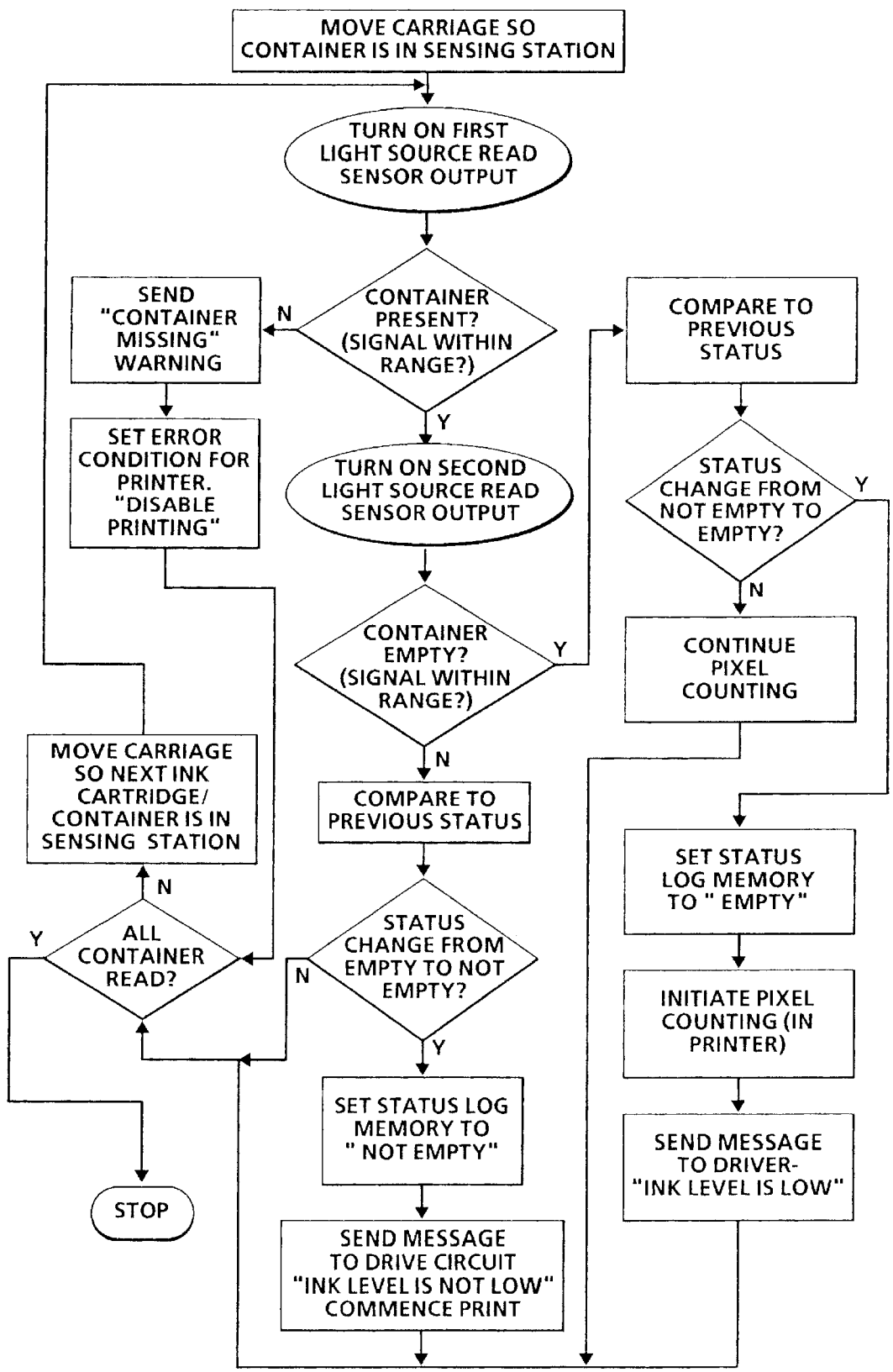
FIG. 8 is an algorithm for the FIG. 7 embodiment which is used to sequence the presence or absence of a container and the low ink sensing sequentially.

In operation and referring to FIGS. 4, 7 and 8, image signals from P/C 52 to controller 50 initiate a start print sequence. Carriage 77 is moved so as to position the cartridge 72 with first ink container 80 opposite the sensing assembly 90. Under control of controller 50, power source 50, is caused to sequentially energize light sources 94, 96 while measuring the output of photosensor 98. The sequencing and detection operation for cartridge 72 is the same as that previously described for cartridge 10. Source 96 is first energized to check that the cartridge is present (reflections from roof mirror 84 to the photosensor is within range), source 94 is turned on, and the ink level in the container system is determined after making comparisons with the previous status. (Reflections from prism 82 front surface are sensed by photosensor 98). Once cartridge 72 is serviced, carriage 77 is moved to position the next cartridge 73 in position to be sensed. The preceding process is enabled for each cartridge until all cartridges have been confirmed as being in place and all ink levels in the assembly ink containers are either within the acceptable levels or appropriate low ink level warnings have been displayed at the P/C.

Figure 9:
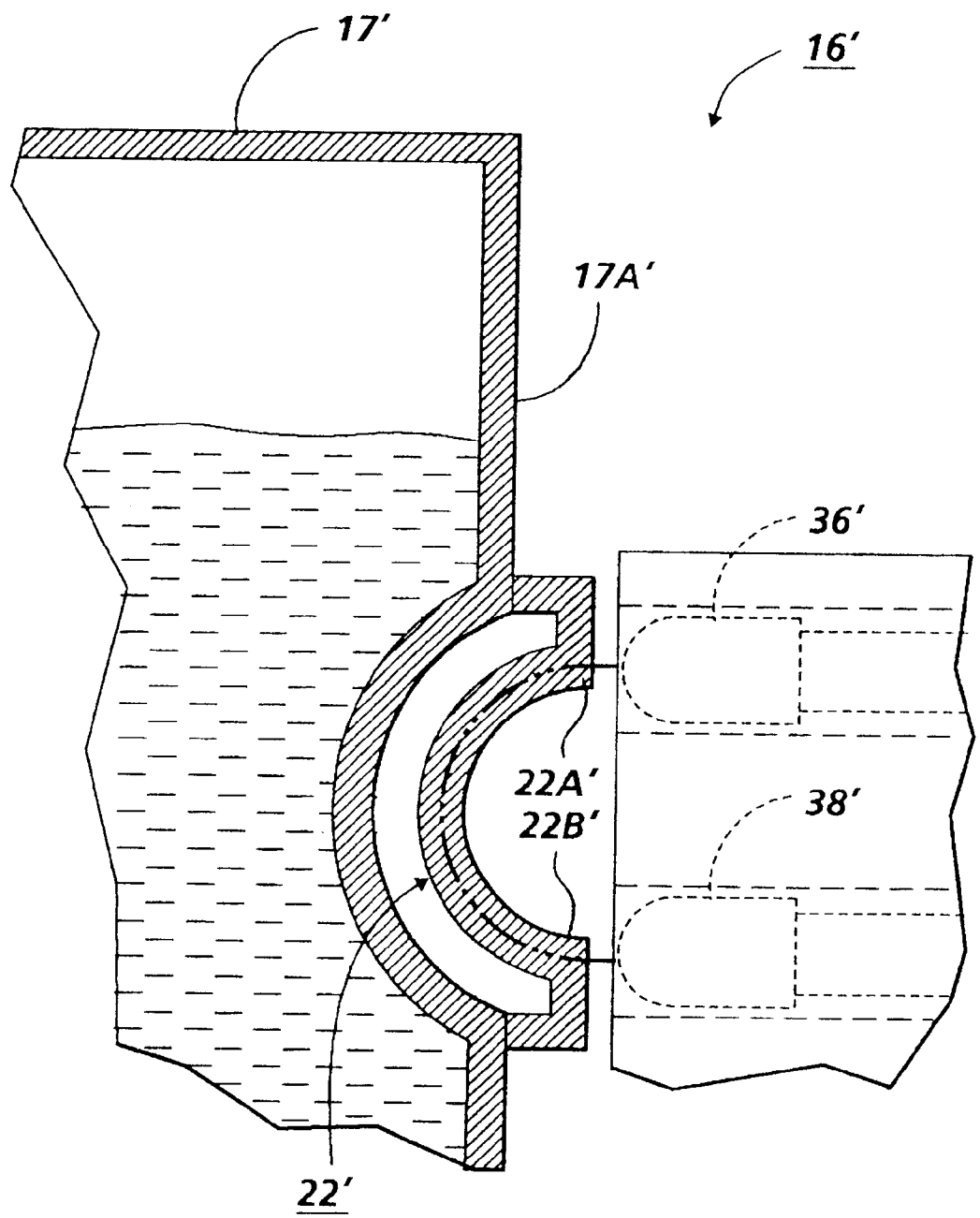
FIG. 9 is an alternate embodiment of a cartridge detection system incorporating a light pipe.

While the embodiment disclosed herein is preferred, it will be appreciated from this teaching that various alternative modifications, variations or improvements therein may be made by those skilled in the art. For example, the detection of the presence or absence of the ink container can be accomplished by using other light directing elements. One example is a light pipe shown in FIG. 9. FIG. 9 shows a portion of a container 16' with an optical element 22' positioned on the outside of the housing wall 17A'. Element 22' is a light pipe curved so as to redirect light entering end 22'A and exiting end 22'B onto photosensor 38'. Optical element 22' may alternately be an optical fiber. With either embodiment, the same function is performed as reflective element 22 in FIG. 2. If the container is present, a high current is generated in photosensor 38'.

The light transmission embodiments may be preferred for some systems since the reflective foil or tape used to form the roof mirror 22 for the FIG. 2 embodiment may not adhere well to the prism facet surfaces.

Figure 10:
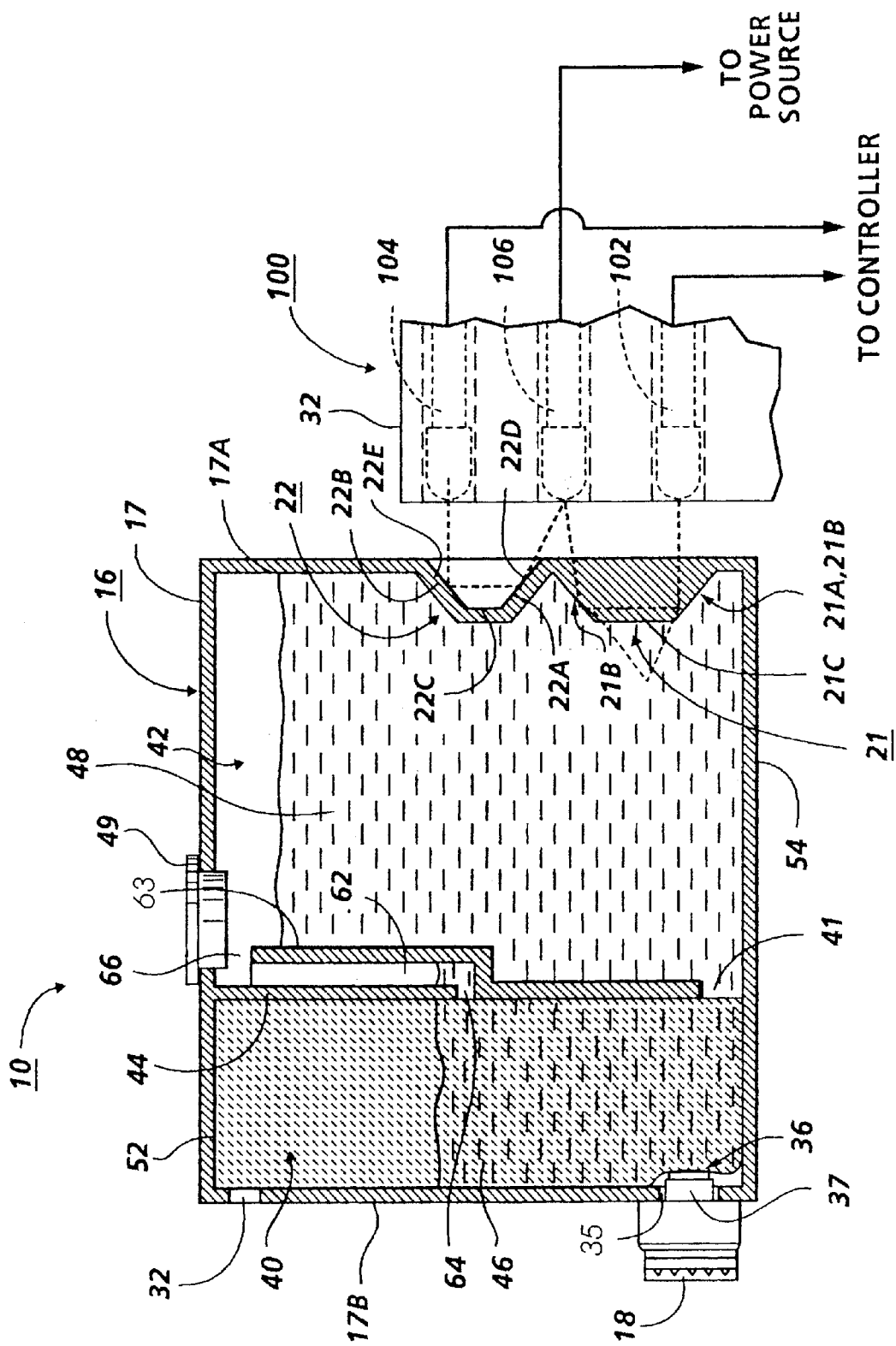
FIG. 10 is an alternate embodiment of the optical assembly shown in FIGS. 1 and 2.

And while the optical assembly 30 of the FIG. 1 embodiment is believed optimum, other arrangements of the light sources and photosensors of the assembly are possible consistent with the invention. One example is shown in FIG. 10 which uses one light source and two photosensors. As shown, an optical assembly 100 which includes a first and second photosensor 102, 104 and whose output is read by the controller. An LED light source 106 is connected to a power source. The operation for detecting the container is the same as the preceding description. The light level will be sensed at photosensor 104 with an appropriate signal sent to the controller. Correspondingly, the low ink reading is made at sensor 102. In this embodiment, the LED may be either operated continuously or intermittently (pulsed).

Another less efficient arrangement is possible (not shown) where a light source and sensor are associated with each reflective element 21,22 in FIGS. 1 and 2.

As another example, while the FIG. 1 and FIG. 7 embodiments show the ink container mounted on a scanning carriage which is periodically moved to a detection station, the ink containers may be positioned in a fixed location and connected to the scanning printhead via a flexible ink supply line. For the FIG. 1 embodiment, container 16 would be fixed in position opposite optical assembly 30 and connected to printhead 18 via a flexible tube. For the FIG. 7 embodiment, four optical assemblies would be located outside the print zone opposite from an associated ink container, each of the ink containers connected to the respective printhead cartridge via flexible ink couplings. For the case of a full width array printhead of the type disclosed, for example, in U.S. Pat. No. 5,221,397, a remote ink container is connected to an ink manifold which connects ink with the plurality of input modules which are butted together to form the full width array. One or more optical assemblies would be located opposite the modified ink container.

What is claimed is:

1. A sensing system for detecting the presence of an ink container comprising:
   light directing means operatively connected to said container,
   a light source having output beams directed toward said light directing means when in a container detect mode and
   photosensor means for detecting the presence or absence of light from said light directing means and for generating an output signal indicative thereof.

2. A replaceable liquid ink supply container which is insertable into an ink jet printer having at least one printhead to supply liquid ink from said liquid ink supply container to said printhead, which ink jet printer has at least one container mounting position for receiving said liquid ink supply container in the ink jet printer when said liquid ink supply container is inserted in the ink jet printer, which container mounting position provides for the supplying said liquid ink from said liquid ink supply container to said printhead when said liquid ink supply container is correctly mounted in said container mounting position, and wherein said ink jet printer also has an optical presence sensor for optically detecting said correct mounting of said liquid ink supply container in the container mounting position, and a light source for the optical presence sensor, said light source projecting illumination away from said optical sensor; said replaceable liquid ink supply container comprising a light reflective system integral said replaceable liquid ink supply container positioned to receive said projected illumination from said light source from said ink jet printer and to reflect at least part of said projected illumination from said light source back to said optical docking sensor when said liquid ink supply container is correctly mounted in said container mounting position.

3. The replaceable liquid ink supply container of claim 2, wherein said light reflective system comprises opposing reflective surfaces at different angles to one another.

4. The replaceable liquid ink supply container of claim 2, wherein said light reflective system comprises facing reflective surfaces at equal but opposite angles.

5. The replaceable liquid ink supply container of claim 2, wherein said light reflective system comprises a pair of planar reflective surfaces at equal but opposite angles to one another.

6. A replaceable liquid ink supply container which is insertable into an ink jet printer having at least one printhead to supply liquid ink from said liquid ink supply container to said printhead, which ink jet printer has at least one container mounting position for receiving said liquid ink supply container in the ink jet printer when said liquid ink supply container is inserted in the ink jet printer, which container mounting position provides for the supplying said liquid ink from said liquid ink supply container to said printhead when said liquid ink supply container is correctly mounted in said container mounting position, and wherein said ink jet printer also has an optical presence sensor for optically detecting said correct mounting of said liquid ink supply container in the container mounting position, and a light source for the optical presence sensor, said light source projecting illumination in a first direction away from said optical sensor; said replaceable liquid ink supply container comprising a first light reflective surface on said replaceable liquid ink supply container positioned to receive said projected illumination from said light source from said ink jet printer and to reflect at least part of said projected illumination from said light source in a second direction, and a second light reflective surface on said replaceable ink supply container positioned to receive said part of said illumination reflected in said second direction, and to reflect at least a part of said reflected illumination back to said optical docking sensor when said liquid ink supply container is correctly mounted in said container mounting position.

7. The replaceable liquid ink supply container of claim 6, wherein said third direction is substantially parallel to said first direction.

8. The replaceable liquid ink supply container of claim 7, wherein the second direction is substantially perpendicular to the first direction.

9. In an ink jet printer having at least one printhead and an ink supply container for supplying ink from the ink supply container to the printhead, when said ink supply container is correctly installed in a container mounting, a method of optically detecting whether the ink supply container is correctly installed in the said container mounting, the method comprising projecting illumination away from an optical sensor, reflecting from a light reflective system said ink supply container at least a portion of said illumination, when the ink supply container is correctly installed, sensing said reflected portion of said illumination, comparing said reflected portion of said illumination with a predetermined threshold, and if said reflected portion of said illumination and if said reflected portion of said illumination exceeds said predetermined threshold, providing an indication that the ink supply container is correctly installed in said container mounting.

10. The method of optically detecting whether an ink supply container is correctly installed in a container mounting of claim 9, wherein the step of reflecting from a light reflective system on said ink supply container comprises reflecting from a first reflective surface toward a second reflective surface on said ink supply container at least a portion of said illumination and reflecting from said second reflective surface at least a portion of said reflected illumination.

* * * * *